(12) United States Patent
Bogenberger et al.

(10) Patent No.: US 8,527,681 B2
(45) Date of Patent: Sep. 3, 2013

(54) DATA PROCESSING SYSTEM, DATA PROCESSING METHOD, AND APPARATUS

(75) Inventors: Florian Bogenberger, Poing (DE); Joachim Kruecken, Munich (DE); Christopher Temple, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 493 days.

(21) Appl. No.: 12/599,994

(22) PCT Filed: May 25, 2007

(86) PCT No.: PCT/IB2007/051984
§ 371 (c)(1),
(2), (4) Date: Oct. 8, 2010

(87) PCT Pub. No.: WO2008/146091
PCT Pub. Date: Dec. 4, 2008

(65) Prior Publication Data
US 2011/0066779 A1    Mar. 17, 2011

(51) Int. Cl.
*G06F 13/00* (2006.01)
*G06F 3/00* (2006.01)
*G06F 11/00* (2006.01)
(52) U.S. Cl.
USPC .............. 710/107; 710/38; 710/316; 710/61; 714/10
(58) Field of Classification Search
USPC ............ 710/14, 15, 19, 36, 38, 61, 107, 305, 710/306, 316; 714/10–13
See application file for complete search history.

(56) References Cited

U.S. PATENT DOCUMENTS 4,546,437 A    10/1985    Bleckmann et al.
5,812,757 A *    9/1998    Okamoto et al. ............... 714/11
(Continued)

FOREIGN PATENT DOCUMENTS

DE    4137124 A1    5/1993
EP    0843853 A1    5/1998
(Continued)

OTHER PUBLICATIONS

Kottke T et al: "A Reconfigurable Generic Dual-Core Architecture" 2006 International Conference on Dependable Systems and Networks IEEE Piscataway, NJ, USA, 2006, p. 10.

(Continued)

*Primary Examiner* — Tim T Vo
*Assistant Examiner* — Trisha Vu

(57) ABSTRACT

A data processing system may include a first data path and a second data path. A set of components may include a system component and a partner component, each having a communication interface for communicating data. The components are operable in a synchronized mode and a non-synchronized mode with respect to each other. The set may further include a configuration control system connected to the system component and the partner component, for controlling the set to be in a synchronized mode configuration or a non-synchronized mode configuration. The configuration control system may include a first path selector module connecting the communication interface of the system component to the first data path and the second data path and a partner path selector module connecting the communication interface of the partner component to the first data path and the second data path. The path selector modules may be arranged to enable, depending on the configuration, communication of data to the respective component via one or more selected data path, selected from the first data path and the second data path, and to inhibit communication via the not selected data paths.

20 Claims, 6 Drawing Sheets

(56) References Cited

U.S. PATENT DOCUMENTS

| | | | |
|---|---|---|---|
| 5,835,363 A * | 11/1998 | Chen | 363/41 |
| 5,862,502 A | 1/1999 | Giers | |
| 5,968,185 A * | 10/1999 | Bressoud et al. | 714/10 |
| 6,201,997 B1 | 3/2001 | Giers | |
| 6,327,175 B1 * | 12/2001 | Manapat et al. | 365/154 |
| 6,502,019 B1 | 12/2002 | Zydek et al. | |
| 6,615,366 B1 | 9/2003 | Grochowski et al. | |
| 6,823,251 B1 | 11/2004 | Giers | |
| 6,857,052 B2 * | 2/2005 | Amano | 711/154 |
| 6,865,179 B1 * | 3/2005 | Cao | 370/352 |
| 6,928,563 B2 * | 8/2005 | Kato | 713/320 |
| 7,245,552 B2 | 7/2007 | Freebern | 365/189.14 |
| 7,392,426 B2 * | 6/2008 | Wolfe et al. | 714/11 |
| 7,450,463 B2 * | 11/2008 | Lee | 365/230.08 |
| 7,501,968 B2 * | 3/2009 | DuPuis et al. | 341/141 |
| 7,613,853 B2 * | 11/2009 | Chauhan et al. | 710/61 |
| 7,672,290 B2 * | 3/2010 | Park | 370/350 |
| 7,711,969 B2 * | 5/2010 | Lee | 713/322 |
| 7,864,730 B2 * | 1/2011 | Kim et al. | 370/331 |
| 8,010,846 B1 * | 8/2011 | Birkedahl et al. | 714/38.1 |
| 8,127,180 B2 * | 2/2012 | Baleani et al. | 714/25 |
| 8,219,860 B2 * | 7/2012 | Fey et al. | 714/712 |
| 2006/0161918 A1 | 7/2006 | Giers | |
| 2006/0236351 A1 * | 10/2006 | Ellerbrock et al. | 725/81 |
| 2008/0052494 A1 | 2/2008 | Weiberle et al. | |
| 2010/0211819 A1 | 8/2010 | Weiberle et al. | |
| 2011/0066779 A1 * | 3/2011 | Bogenberger et al. | 710/107 |

FOREIGN PATENT DOCUMENTS

| | | |
|---|---|---|
| EP | 0915789 A1 | 5/1999 |
| EP | 0981783 A1 | 3/2000 |
| WO | 02/093287 A2 | 5/2002 |
| WO | 2005/045664 A2 | 5/2005 |

OTHER PUBLICATIONS

Avizienis A A: "The Methodology of N-Version Programming" Software Fault Tolerance, 1995, pp. 23-46.

International Search Report and Written Opinion correlating to PCT/IB2007/051984 dated May 6, 2008.

* cited by examiner

DATA PROCESSING SYSTEM, DATA PROCESSING METHOD, AND APPARATUS

FIELD OF THE INVENTION

This invention relates to a data processing system, a method for processing data and an apparatus including a data processing system.

BACKGROUND OF THE INVENTION

Data processing systems with two or more processing units are known. For example, U.S. Pat. No. 6,615,366 discloses a processor with dual execution cores that may be switched dynamically between high reliability and high performance execution modes. When the processor is in high reliability mode, the dual execution cores operate in lock step on identical instructions. In the high performance mode the dual execution cores operate independently.

However, a disadvantage of this prior art processor is that, in the high performance mode, the performance of the processor is limited because the executions cores cannot share resources. Accordingly, for example when an execution core performs an operation with a high processing load in the high performance mode, and the other execution core performs an operation with a low processing load in the high performance mode, resources of the latter are underutilised.

United States Patent Application publication US 2006/0161918 discloses a microprocessor system with safety functions. The system includes a plurality of processor cores. Each of the cores is connected to peripheral elements by way of its own, separate, bus. In case of a safety critical algorithm running on the microprocessor system, the cores and the peripheral elements operate as a fully redundant system using fully redundant memory addresses in the respective peripheral memory elements. A bridging device is present which can be used to transmit bus information from one bus to the other bus and to have an address monitoring device connected to the bridging device store information in a non-redundant memory address in case of a non-safety critical algorithm running on the processor core.

However, a disadvantage of this microprocessor system is that although additional resources are available in case the processor core runs a non-safety critical algorithm, still processing power is limited. For example, in case only a non-safety critical algorithm is run, the redundant peripheral resources of the other processor core are not available to the processor core connected to the bridging devices.

SUMMARY OF THE INVENTION

The present invention provides a data processing system, a data processing method, and an apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
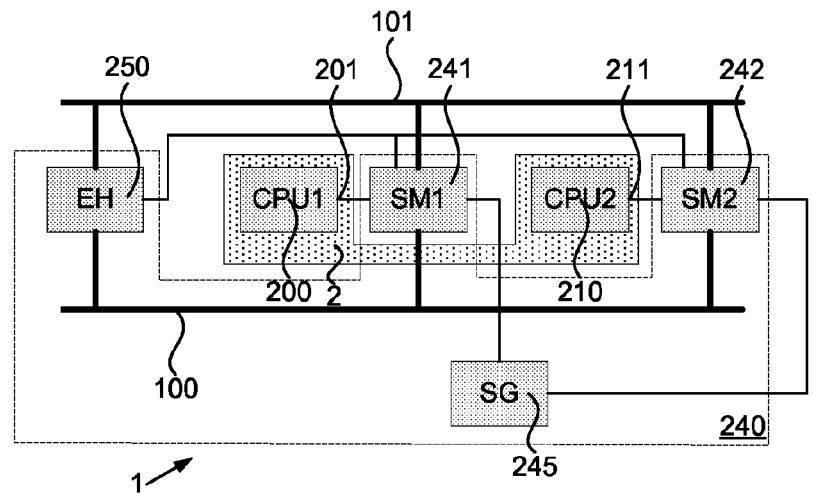
FIG. 1 schematically shows a block diagram of a first example of an embodiment of a data processing system.
Figure 2:
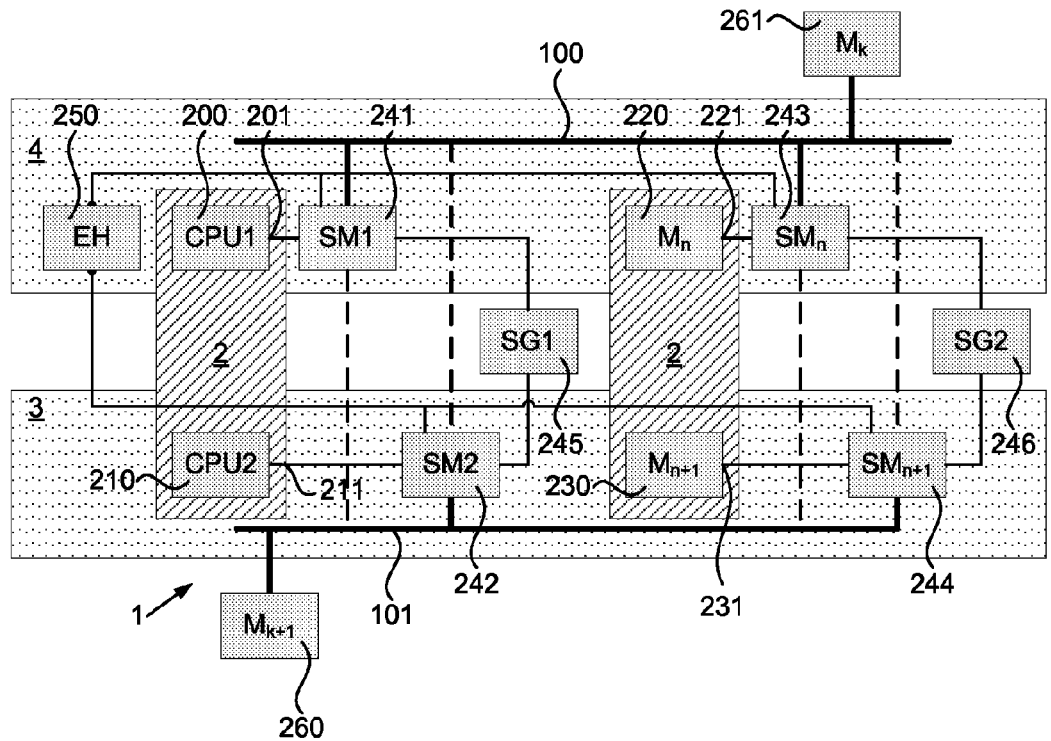
FIG. 2 schematically shows a block diagram of a second example of an embodiment of a data processing system in an example of a synchronised mode configuration.
Figure 3:
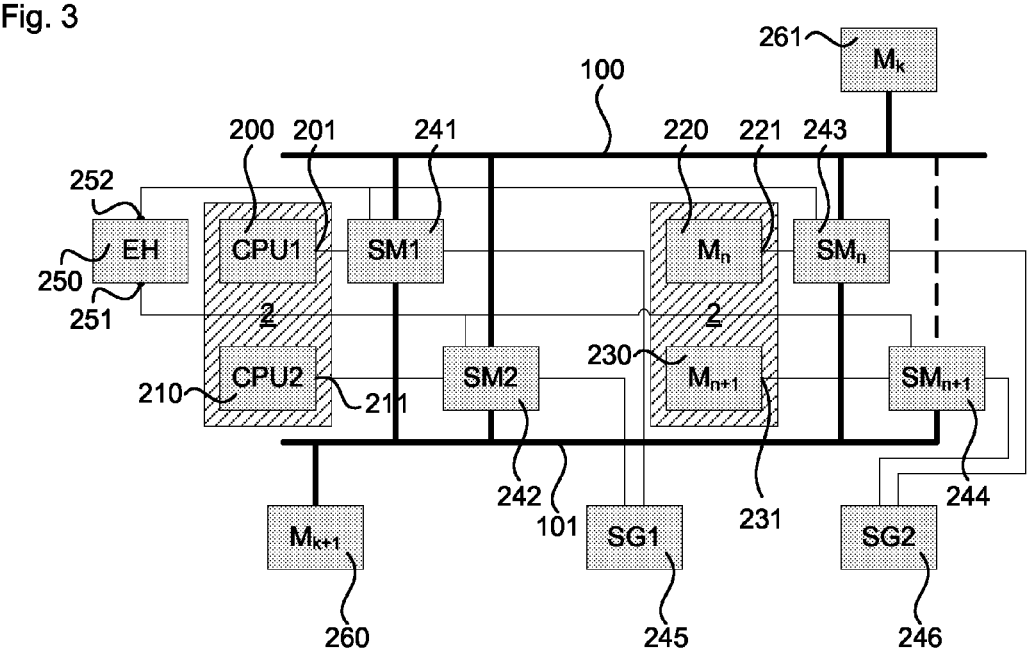
FIG. 3 schematically shows a block diagram of the second example in an example of a not-synchronised mode configuration.

Referring to the example of FIG. 1, a data processing system 1 is shown. The data processing system 1 may include a first data path 100 and a second data path 101. As shown in FIGS. 1-3, the first data path 100 and the second data path 101 may be of a similar type and for example each be a communication bus. However, the data paths 100,101 may alternatively or in addition have another type of path and/or paths of different types. Via the data paths 100,101 data may be communicated between components of the data processing system 1 and/or to devices or systems outside the data processing system 1. The data may for example include address data, data to be written to, or read from, a memory, command data or other data suitable to be communicated.

The data processing system 1 may further include one or more sets 2 of components 200,210 (in the example of FIG. 1 for sake of simplicity only a single set 2 is shown). The set 2 may include a system component 200 and a partner component 210. In the example of FIG. 1, for example a first processor core CPU1 and a second processor core CPU2 are shown. However the components 200,210 may also be implemented as different types of components and for example include a memory, and/or an input/output (IO) unit, and/or a coprocessor and/or a peripheral device of a multi-core processor.

As shown in FIG. 1, the components 200,210 in the set 2 may each have a communication interface 201,211 for communicating data. The data may for example be transmitted to other components in the system 1 or outside the system 1. The data may for example be transmitted over one or more of the data paths 100,101 The components 200,210 in the set 2 may be operable in a synchronized mode and a non-synchronized mode with respect to each other.

In the synchronized mode, the components 200,210 in the set 2 may form a redundant set, e.g. the components 200,210 may each be able to perform one or more functions, of which at least one function is the same for the components. Accordingly, the components 200,210 of a set 2 have the capability to substitute for each other for this at least one function when necessary, for example when a failure is detected in one of the components, so that the system can continue to perform its function. For example, the partner component 210 may perform a partner operation similar and time-synchronized with respect to an operation being performed by the system component 200. Thereby, the reliability and hence the safety of the data processing system 1 can be increased since the chance that an error occurs in both components 200,210 simultaneously is very small.

For example, in the synchronised mode, the output of the components 200 and 210 in the set 2 may be compared. Thereby, the reliability and hence the safety of the data processing system 1 can be increased since the chance that an error occurs simultaneously in both components 200,210 and that this error results in the same output is very small.

In the non-synchronized mode, the partner component 210 may perform an operation not synchronized to the operation that is being performed by the system component 200. For example, the partner component 210 may perform a second task different from a first task performed by the system component 200. Thus, in the non-synchronised mode, the data processing system 1 is able to perform more operations and hence processing power is increased. For instance, in the non-synchronised mode the partner component 201 may be in an a-synchronised mode in which it operates independent from the system component 200 or a test mode in which the partner component 201 or the system component 200 executes a self-test routine while the other components performs another operation.

Also, for example, the data processing system 1 may, in the non-synchronous mode, execute N-versions of a computer program, which versions are different but provide the same functionality. The version may for example have been developed independent from each other but based on the same specification. The data processing system 1 may then in the synchronized mode execute a voting mechanism which determines a correct result from the results provided by the N-version, for example using the so called N-version programming approach.

For example, a component and its partner component may in the non-synchronised mode operate in an N-version mode. That is, the component and its partner component may each execute a set of instructions forming an algorithm, the sets being different, for example due to different implementations of the algorithm or the algorithms themselves being different, but providing the same functionality. Thus, the sets provide the same functionality but use different calculations. Thereby, the reliability can be improved since the chance that the same fault occurs in more than one of the sets relatively small. A set of comparing components in the synchronous mode may then compare the results obtained by the different sets of instructions. For example, the components executing the sets of instructions may include the processor cores and the processors cores may be switched from the non-synchronous mode to the synchronous mode in order to compare the results.

The system component 200 may for instance include a first processing core and the partner component 210 may include a second processing core. The processing cores may for example, in the synchronised mode, both run a computer program A, e.g. in lockstep, that is run the same set of operations at the same time in parallel while running independently from each other in the not-synchronised mode. For example, the system component 200 may perform a task A which consists of a sequence of operations $O_1(t_1) \ldots O_N(t_N)$, such as processing data and/or storing and/or transmitting data, at times $t_1 \ldots t_N$ and the partner component may perform an identical task A consisting of a sequence of operations $O_1(t_1) \ldots O_N(t_N)$ at the same times $t_1 \ldots t_N$. For instance, in the not-synchronised mode the first processing core may execute a program B whereas the second processing core may execute a program C or, for instance, execute a test routine.

As shown in FIG. 1, the data processing system 1 may include a configuration control system 240 which can control the configuration of the set 2. As shown in the example of FIG. 1, the configuration control system 240 may be connected to the system component 200 and the partner component 210. The configuration control system 240 may control the set 2 to be in a synchronized mode configuration or a non-synchronized mode configuration. Thereby, the reliability of the data processing system 1 can be increased when desired whereas, when a lower reliability is sufficient, the processing power of the data processing system 1 can be increased by changing the configuration to the non-synchronized mode configuration.

As shown in FIG. 1, the configuration control system 240 may include a first path selector module 241 connecting a communication interface 201 of the system component 200 to the first data path 100 and the second data path 101. The configuration control system 240 may further include a partner path selector 242 module which connects a communication interface 211 of the partner component 210 to the first data path 100 and the second data path 101.

The path selector modules 241,242 may enable, depending on the desired configuration, the communication of data to the respective component 200,210 via one or more selected data paths, e.g. selected from the first data path 100 and the second data path 101, and inhibit communication via the not selected data paths. Accordingly, the logical architecture of the data processing system 1 may be changed after manufacturing the data processing system 1 and the flexibility of the data processing system 1 may be increased. The architecture may for example be changed depending on the application running on the data processing system in the synchronised mode or the non-synchronised mode. Also, the distribution of resources may be optimised in the non-synchronised mode while a high reliability can be obtained in the synchronised mode. For instance, a component may use two or more paths 100,101 in the non-synchronised mode (allowing two or more processes to use the respective component). In the synchronised mode, the component may e.g. use a single path, different from the path used by the other component of the set, enabling a separation of redundant processes.

As illustrated in FIG. 2, the data processing system 1 may include two or more sets 2 of components. For instance, the data processing system 1 may include a set of two or more processing cores CPU1,CPU2, and one or more sets of peripheral components, indicated in FIG. 2 with reference signs 220,230, such as memory components or other peripheral components for a processor core of a multi-core processor. Thereby, the mode of individual modules may be adjusted to the requirements of the specific application in which the system is used, and for instance the system may be reconfiguration dynamic during operation.

For instance, the data processing system 1 may be implemented fully redundant, that is: for each component $M_N$ in the data processing system there is a partner component $M_{N+1}$ which, at least in the synchronised mode, can perform the same functions as the system component M. However, the data processing system may include one or more components 260,261 that do not have a redundant partner component. For example, as shown in FIG. 2, the data processing system may include one or more non-redundant components $M_k$, $M_{k+1}$ which may be connected to a single data path or to a plurality of the data paths 100,101. For example, the data processing system 1 may include a component that can be used by two or more data processing modules, such as for example a separate hardware image processing module or an Ethernet module.

As illustrated in FIG. 2 with the dashed lines between the path selector modules 241-244 and the data paths 100,101, in the synchronised mode, the path selector modules 241-244 may allow the respective component 200,210,220,230 in the set 2 to communicate over a single path only, and inhibit communication from and/or to the respective component over the other path. Thereby, for example, the data processing system 1 may be operated in the synchronised mode as a fully-redundant system without sharing of resources between the redundant systems. For instance, the components in each set may be allowed communicate over different paths, i.e. the respect connect path selector modules 241-244 may select a different path for each component 200,210 resp. 220,230 in the set 2. In FIG. 2, for example in addition to processor cores CPU1,CPU2, the peripheral components 220,230 are shown, which are connected, via respective data path selector modules 243,244, to a data paths 100 resp. 101. For instance, in the synchronised mode, the respective data path selector modules 241-244 may allow, for each set 2, a component to communicate via the first data path 100 only and allow another component in the set 2 to communicate via the second data path 101 only, as is illustrated in FIG. 2 with the dashed lines between the respective signal path selector modules 241-244 and the signal paths 100,101.

However, in the synchronised mode, one or more the path selector modules 241,242 may also enable communication to the respect component via two or more of the paths 100,101. Thereby, for example, non-critical resources can be shared and accordingly the amount of components may be reduced. As illustrated in FIG. 2, for example, the path selector modules 241-244 may be configured such that, in the synchronised mode, two or more redundant data processing modules 3,4 are formed. The data processing modules 3,4 may for example operate in lockstep in the synchronised mode. However, the data processing modules 3,4 may alternatively operate in a synchronised manner, without being in lockstep, in which the initialisation of an operation by a (component of) a data processing module 3 resp. 4 is controlled by the data on the signal path(s) 100,101 of the (partner component in the) other data processing module. Thus, the data processing modules 3,4 may be regarded as being synchronised on their output. Thereby, for example, the data processing modules 3, 4 may operate with different clock domains and/or have a different performance.

The output synchronisation may for example, be implemented by a comparison between the data on the first signal path and the data at the second signal path by a respective signal path selector module 241-244. In case the data is similar, for example in case the same request is transmitted over the first path 100 and the second path 101, an operation may be allowed by the component connected respective signal path selector module 241-244.

As shown in FIG. 2, for instance, a first data processing module 3 may include the first processor core 200 and the components which are allowed to communicate 200,220 via the first data path 100. A second data processing module 4 may include the second processor core 210 and the components 210,230 which are allowed to communicate via the second data path 101. As for example shown in FIG. 2, for instance, the path selector module 241 for a first processor core CPU1 may select a first data path 100 and the path selector module(s) 244 of the peripherals 220 to be used by that processor core may select the first data path 100 as well.

The path selector module 242 for a second processor core CPU2 may then select a second data path 101, e.g. separate from and not-overlapping with the first data path 100, and the path selector modules 245 of the peripherals 230 to be used by that second processor core may select the second data path 100 as well.

As illustrated in FIG. 3, for example, in the not-synchronised mode, the path selector modules 241,242 may select, for instance, one or more of the data paths 100,101 and allow communication from or to the respective component 200, 210,220,230 via the selected data paths. As illustrated in FIG. 3 with the dashed lines between the respective path selector module 244 and the data path 100,101, the respective path selector modules may inhibit communication from or to the respective component 200,210 via the non-selected data paths. Thereby, for instance, the use of the resources, such as data processing capacity and/or memory use and/or bandwidth and/or power consumption and/or other parameters, may be adjusted in the non-synchronised mode to the specific requirements of the application. For example, the resources available for a respective processing core CPU1,CPU2 may be adjusted to the specific requirements of the task performed by the processing core and/or resources may be shared between processing cores. Thereby, a more efficient use of the resources may be obtained.

The path selector modules 241,242 may for instance be select in the not-synchronised mode one or more predetermined data paths 100,101. For example, the path selector modules 241,242 may receive from an external component information about which data path is to be selected, such as from a processor core, an interrupt request, or a signal from outside the data processing system 1 or other suitable source. The configuration control system 240 may for example include a (small) memory and configuration state machine (not shown) to store and apply the configuration information. The path selector modules may for example select, in the non-synchronised mode a single data path 100 resp. 101, as illustrated with the path selector module 244. However, as shown in FIG. 3, one or more components 200,210,220 may also be allowed to communicate via two or more of the data paths, for instance in case the resources of the respective component are to be shared between different processing cores.

Figure 4:
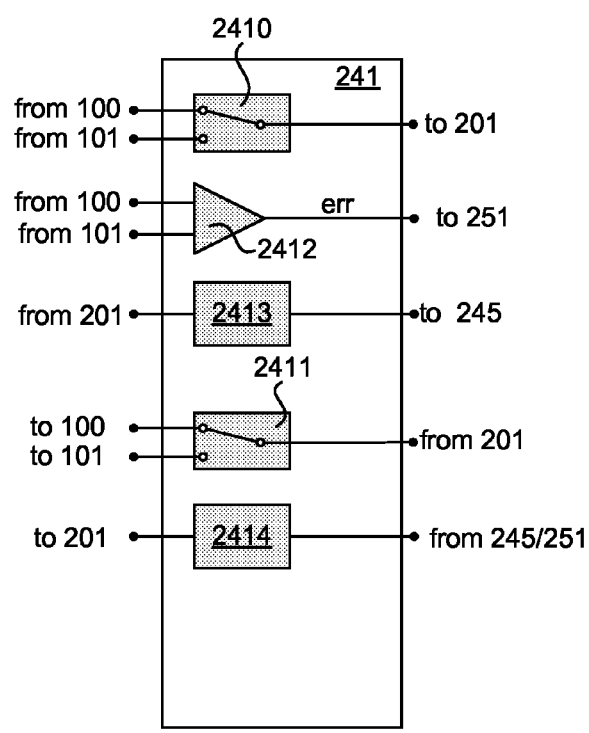
FIG. 4 schematically shows a block diagram of an example of an embodiment of a path selector module.

The configuration control system 240 may include a first comparator module connected with an input to the first data path 100 and the second data path and a partner comparator module connected with an input to the first data path 100 and the second data path 101. As shown in FIG. 4, for instance, the comparator modules 2412 may be integrated in the respective path selector module 241-244. However the comparator module 2411 may also be implemented separately.

As shown in FIG. 4, the path selector module 241-244 may for instance include a switch unit 2410,2411 which can select one or more of the data path(s) 100,101 corresponding to the desired configuration. In FIG. 4, the switch units 2410,2411 are shown in a state in which path 100 is selected only, however the switch unit 2410,2411 may also select more than one of the paths 100,101. The path selection may be direction dependent, as is illustrated with the switch unit 2410 which allows a selection of the path for the data flow towards the respective component and the switch unit 2411 which allows a selection of the path for the flow of data originating from the respective component.

The path selector module 241-244 may include a comparator module 2412 connected to the data paths 100,101, and a component state sensor module 2413 connected to the communication interface 201 of the respective component 200 and to a mode transition control module 245. The path selector module 241,244 may, as shown in FIG. 4, also include a component state controller 2414 connected with an input to mode transition control module 245 and/or a communication interface 251 of a central control module 250 and with an output to the communication interface 201 of the respective component 200-203.

The comparator module 2412 may, for instance, compare data transmitted via the first data path 100 with data transmitted via the second data path 101, e.g. the data transmitted by the path selector module 242 resp. 243 of the partner component 210 resp 230. For example, the comparator modules may, in the synchronised mode, compare data being transmitted along the first data path 100 with the data being transmitted along the second data path 101. Thereby, errors in the operation can be detected, when operating correctly, since in the synchronised mode the redundant components perform the same operation and operate in a synchronised manner. Hence, when operating correctly over the respective data paths 100,101 the same data is transmitted within a time interval which may be relatively short. As shown in FIG. 4, the comparator module 2412 may have a control output at which a result of the comparison may be outputted. The comparator module 2412 may for instance output an error signal err in case the data transmitted over the data paths 100,101 differ in the synchronised mode. The comparator module 2412 may also output a correct signal when the data transmitted over the signal paths are the same. Thereby, for example, a central control module 250 may check whether the comparator module in a path selector module 241 and its partner module 242 both detected the match in the data on the paths 101,101. Also, a faulty comparator that does not confirm a match or mismatch in the data may be detected through a time out mechanism.

As shown in FIG. 4, the comparator module outputs may be connected to a central control module 250, for instance to a communication interface 251 thereof. The central control module 250 may compare the results and control the data processing system 1 based on this result. For instance, in case a comparator module 2411 outputs the error signal err, the central control module 250 may change to system 1 to a safe mode and/or initiate the execution of a diagnostic procedure to determine where an error has occurred. Also, in case a comparator module 2411 which is connected to a component 200,220 of a set 2 outputs an error signal and another comparator module 2411 connected to another component 210, 230 of the same set 2 does not output an error signal, this implies that either one of the comparator modules is faulty or that a local error (visible only to one of the comparator modules) or another error has occurred. The central control module 250 may then, for instance, initiate a diagnostic procedure to determine where an error has occurred in the system 1 or indicate the error to a next higher system level and/or trigger transition to a safe mode.

As shown in FIGS. 1-3, the configuration control system 240 may include a mode transition control module 245,246 connected with an output to the path selector modules 241-244. The mode transition control module 245,246 may transmit a mode transition signal to the path selector modules 241-244. The mode transition signal may also be transmitted to the connected modules 200,210 in order to, for example, enable the connected modules 200,210 a preparation of a mode transition. In response to the mode transition signal the path selector modules 241-244 may select the one or more selected data path(s) 100,101 in accordance with a desired configuration. The mode transition controller 245,246 may for example output the signal to the component state controller 2414. The mode transition control module 245,246 may for instance output the mode transition signal when a transition ready signal has been received from all the components 200,210 resp. 220,230 in a set 2. Thus, the risk may be reduced that components operate a-synchronously at the beginning of the synchronous mode. As shown in FIGS. 2 and 3, each set 2 may for instance have a dedicated mode transition control module 245,246 connected to the path selector modules 241,242 resp. 243,244 of the components 200,210 resp. 220,230 in that set 2. However, a mode transition control module 245,246 may alternatively be connected to the path selector modules 241-244 of two or more sets 2.

As mentioned above, the configuration control system 240 may include a component state sensor module connected with an input to the system component 200 or 220 respectively. The configuration control system 240 may further include a partner state sensor module connected with an input to the partner component 210,230. As shown in FIG. 4, the component state sensor module 2413 may for instance be implemented in the path selector module 241. The state sensor module 2413 may be arranged to determine whether or not the respective component is in a switch ready state and hence ready to be switched from synchronized mode to the non-synchronized mode and/or vice versa. The state sensor module 2413 may be connected to the comparator unit 2412 and determine the point in time at which the comparator unit 2412 performs the comparison. For example, the state sensor module 2413 may control the comparator unit 2412 to perform the comparison when the respective component 200,210,220 or 230 is in a signal stable state in which the respective component 200,210,220 or 230 outputs a stable signal or in a request state in which the respective component 200,210,220 or 230 can receive a request to start an operation.

The state sensor module 2413 may include a sensor output for outputting a switch ready signal when the respective component is in the switch ready state. As shown in FIG. 4, the component state sensor module 2412 may e.g. be connected with the output to the mode transition control module 245 and transmit the switch ready signal to the mode transition control module 245. The mode transition control module 245 may for instance output (e.g. to the component state controller 2414 as shown in FIG. 4) the mode transition signal in case switch ready signals from all the components connected to the mode transition control module 245 (e.g. in the set 2) have been received. The respective components may then switch to the other state and the path selector modules 241-244 may select the paths 100,101 corresponding to the state.

Figure 5:
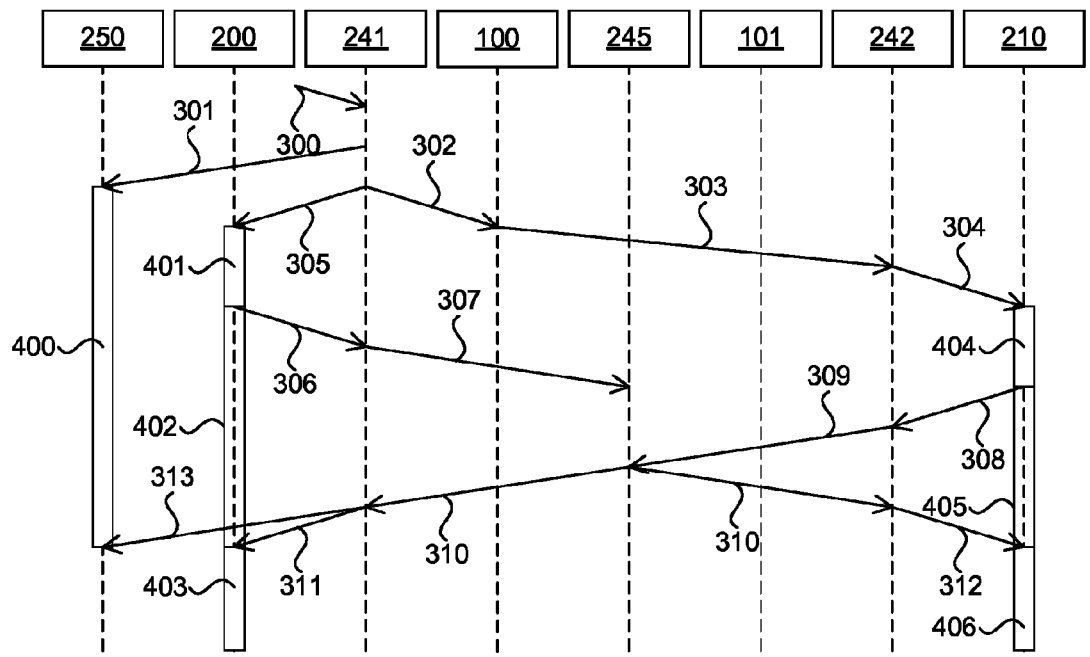
FIG. 5 schematically shows an example of a timing diagram suitable to bring the second example of a data processing system from a not-synchronised mode into a synchronised mode.

Referring to FIG. 5, an example of a timing diagram is shown. The shown timing diagram may for example be used by the example of FIGS. 2 and 3 to switch from a configuration for the not-synchronised mode into a configuration for the synchronised mode. As shown, initially a mode switch request 300 may be received, for instance by a respective path selector module 241. The request 300 may for example be received from the component 200,210,220 or 230 to which the respective path selector module 241-244 is connected, In response, the receiving module may send a message 301 to the central control module 250. The central control module 250 may then start a timer, as indicated with reference number 400. The central control module 250 may in case the timer value exceeds a certain timer threshold, initialize an error routine. The receiving component 241 may further send a mode switch request 305 to the component 200. The path selector module 242 of another component 210 in the set 2 may be informed about the mode switch request 300, e.g. by sending a suitable message 302 to the data path 100 and from the data path 100 to the path selector module 242 in question.

The path selector module 242 receiving the forwarded request 303 may then sent a mode switch request 304 to its component (e.g. in the example of FIG. 5 to the partner component 210).

As indicated with reference numbers 401,404, the components 200,210 may, in response to the mode switch requests 304,305 prepare a mode transition. For instance, the components 200,210 may store a computer program and/or data being processed by the respective component 200,210 and/or complete a current task or perform another action suitable to prepare a mode transition. As shown in FIG. 5, when the mode transition is completed, the component 200,210 is ready for the mode transition and may wait for a synchronised mode start message, as is indicated with the halted blocks 402, 405. The component 200,210 may send a halted message 306,308 to the respective path selector module 241,242. The path selector modules 241,242 may send a transition ready message 307,309 to the mode transition control module 245 in response to reception of the halted message 306,308 from its component 200,210. The mode transition control module 245 may, when transition ready messages 307,309 have been received from all the path selector modules 241,242 connected to the set 2, output messages 310 to the path selector modules 241,242 which indicate that all components in the set 2 are synchronised. The path selector modules 241,242 may in response to the synchronised messages 310 output a start synchronised mode message 311,312 to the respective components and the components 200,210 may then start operating in the synchronised mode, as indicated with reference signs 403,406. The path selector modules 241 may further send a timer stop message 313 to the central control module in order to stop the timer. When the synchronized mode is not reached within the given timeout, the central control module 250 may indicate an error.

Figure 6:
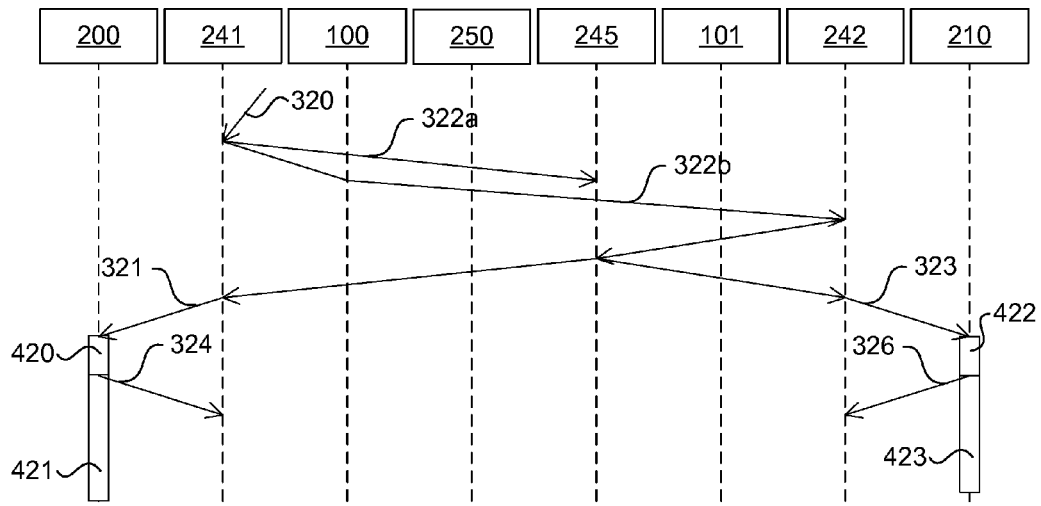
FIG. 6 schematically shows an example of a timing diagram suitable to bring the second example of a data processing system from a synchronised mode into a not-synchronised mode.

As shown in FIG. 6, switching a set 2 from the synchronized mode into a non-synchronized mode may be initiated with the reception of a de-synchronisation request 320. The de-synchronisation request 320 may for example be received by a respective path selector module 241. A mode change request received message 322b may also be transmitted to the other path selector module(s) 242 for the set 2. The path selector module 241 may send a message 322a to the mode transition control module 245 informing the module 245 that the path selector module 241 has received the request.

The respective path selector module 241,241 may, in response to the request 320, or the message 322b, stop comparing the data on the paths 100,101. In response to the de-synchronisation request 320, a mode switch request 321 may be sent to the component 200 connected to the receiving path selector module 241, A mode switch request 323 may also be send to the other component 210. As indicated with blocks 420,430 the components 200,210 may prepare a transition from the synchronised mode to the non-synchronised mode in response to the mode switch request 321,323. For example, the components 200,210 may check if the desynchronisation is allowed, restore the context of the previous non-synchronous operation, reconfigure path selection modules of other components in order to support a different configuration or perform other operations useful for the transition. When the components 200,210 have finished their preparations, respective preparation finished messages 324,326 may be sent to the path selector modules 241,242 in the set 2 and, as indicated with blocks 411,421, the components 200,210 may operate in the non-synchronised mode.

Figure 7:
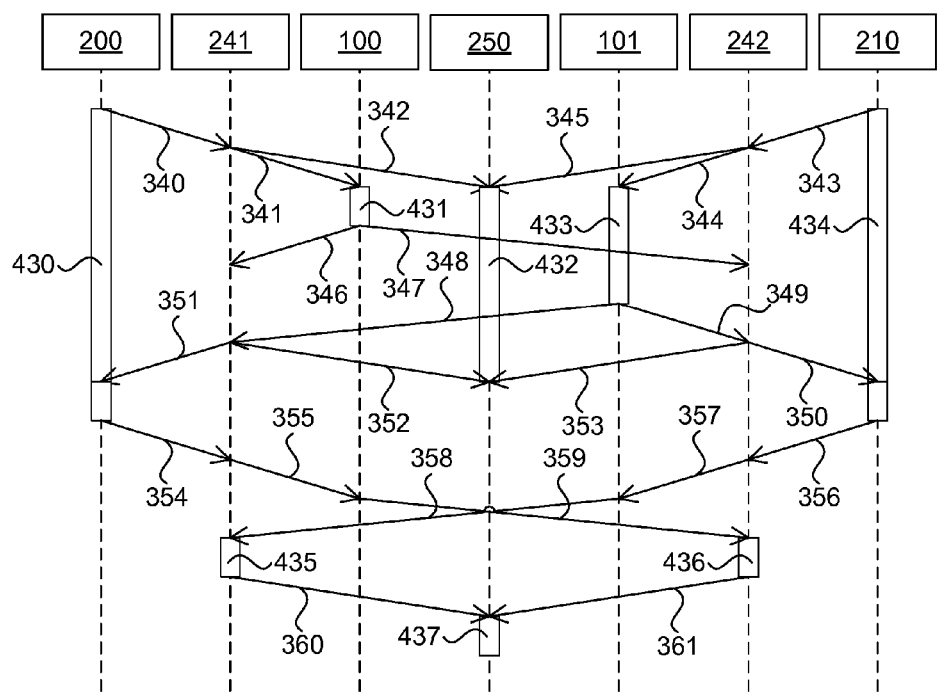
FIG. 7 schematically shows an example of a timing diagram suitable for the second example of a data processing system in the synchronised mode.

Referring to FIG. 7, in the synchronised mode, for example, a component 200 may send a message 340 to the respective path selector module 241. At the same stage of the operation (e.g. at substantially the same point in time when the components are operating in lock step), the other component(s) 210 of the set may output a message 343 to its path selector module 242 since, except for faulty behaviour, in the synchronised mode the components 200,210 of a set 2 operate in a synchronised manner. The path selector modules 241,242 may transmit respective messages 342,345 to the central control module 250 which may start a timer in response to the messages 342,345. In case the central control module 250 does not receive messages 342,345 for all components 200, 210 in the set 2, the central control module 250 may determine that one or more of the components exhibits a faulty behaviour and initiate the execution of an error procedure. As shown in FIG. 7, the path selectors 241,242 may then request access to the respective data path 100,101 by sending an access request 341,344 to the respective data path 100,101 (or an access control thereof). An arbitration procedure may then be executed, as indicated with blocks 431,433. As shown in FIG. 7, the arbitration procedure may have a different duration for the different data paths 100,101. When access is granted, as indicated with arrows 346-349, the path selectors 241,242 send timer stop message 352,353 to the central control module 250 in order to stop the timer. In case the timer is not stopped within a predetermined period of time (which implies that the requests of the two modules 200 and 210 were not granted in time), the central control module may determine that a fault has occurred the path selectors 241,242 may send a request granted message 350,351 to the components 200,210. In response to the request granted message 350,351, the components 200,210 may perform a operation, e.g. sending data over the selected data path 100,101, as indicated with arrows 354,355 resp. 356,357. As indicated with arrows 358, 359, the path selectors 241,242 may receive the data transmitted over both paths 100,101 and as indicated with blocks 435,436 compare (e.g. when signals 354 and 358 receptively 358 and 356 are received) the data with each other and, as indicated with the arrows 360,361, output a result to the central control module 250. The central control module 250 may then compare the results of the path selectors 241,242, as illustrated with block 437, and for instance output an error signal in case the path selectors 241,242 output different results.

Figure 8:
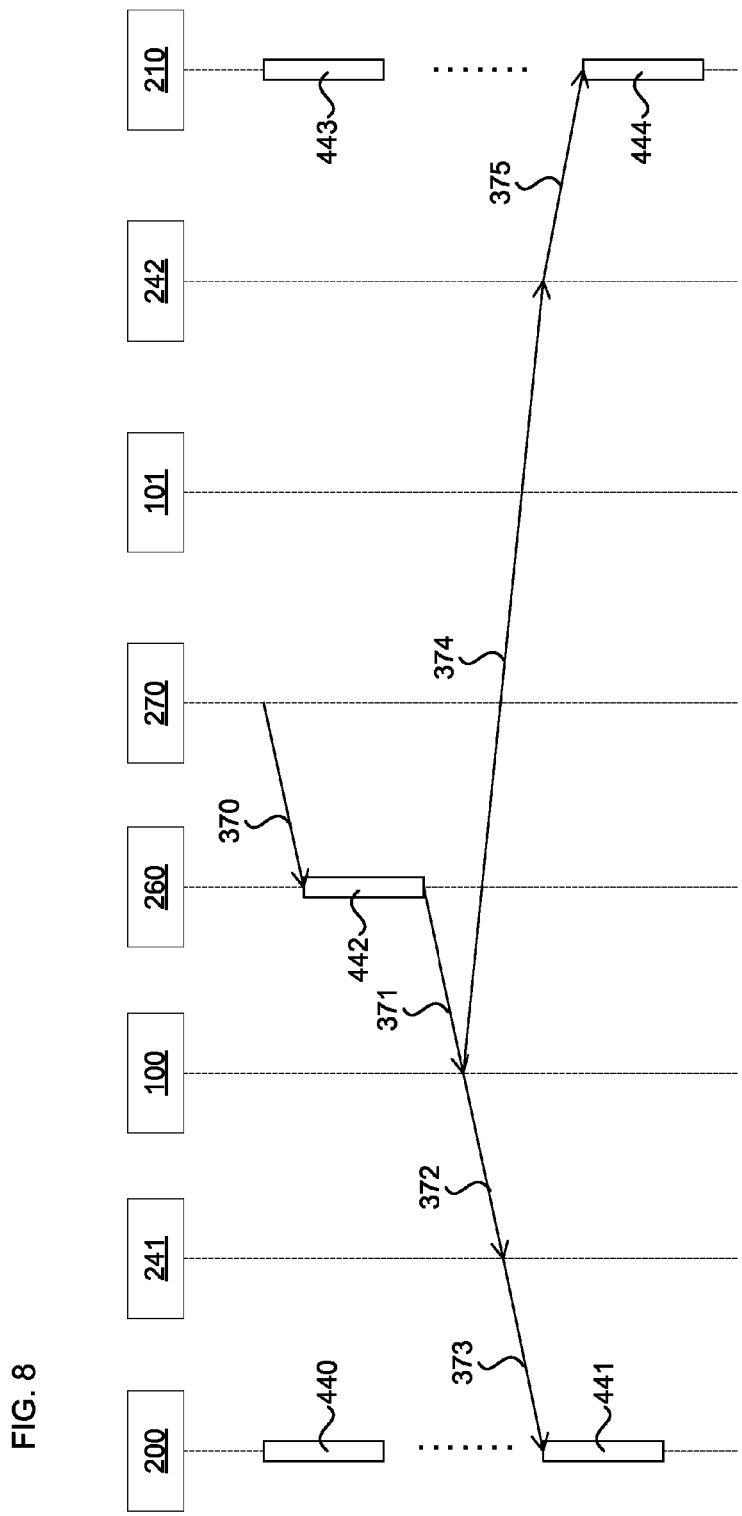
FIG. 8 schematically shows an example of a timing diagram suitable for handling an interrupt request in the synchronised mode.

Referring to FIG. 8, in the synchronised mode, the data processing system 1 may receive interrupt requests 370 from a source 270 of interrupt requests. As shown in FIG. 8, for example, the system 1 may include an interrupt controller 260 connected to one or more of the data paths 100,101. The interrupt controller 260 may be communicatively connected to the interrupt request source(s) 270, and receive the interrupt request 370. The interrupt controller 260 may control the processing of interrupts by the data processing system 1, and, for example, prioritized interrupt requests, as indicated with block 442 in FIG. 8. The interrupt controller 260 may forward an interrupt request to the respective data paths 100, e.g. the interrupt requests with the highest priority. As shown in FIG. 8 with arrow 371, the request may be forwarded to a single path 100 and be received by the path selector modules 241, 242. The path selector modules may then forward the request, as illustrated with arrows 373,375, to the components 200, 201 of a set 2 which, as indicated with blocks 441,444, may then process the interrupt request.

Figure 9:
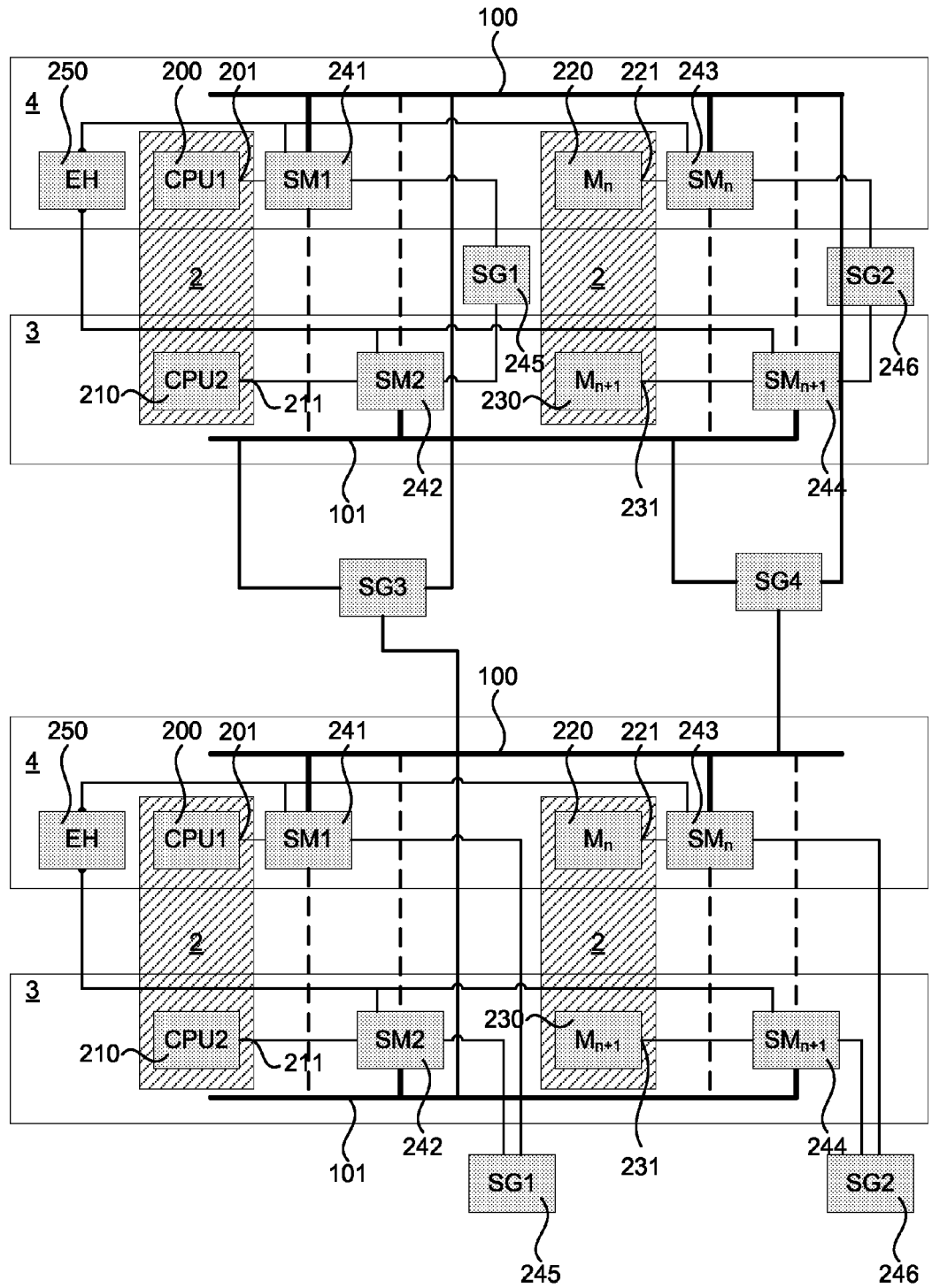
FIG. 9 shows a schematic block diagram of a third example of an embodiment of a data processing system.

Referring to FIG. 9, the components of the set 2 may for example be a single unit, show as a processing core or a memory. However, as shown in FIG. 9 the component may also include a sub-system including multiple units. For example, a component may include a data processing module 3 resp. 4. As shown in FIG. 9, for example, a set of data processing modules 3,4, may be connected via path selection modules SM3,SM4 to the data paths 100,101 of a data processing system 1.

Figure 10:
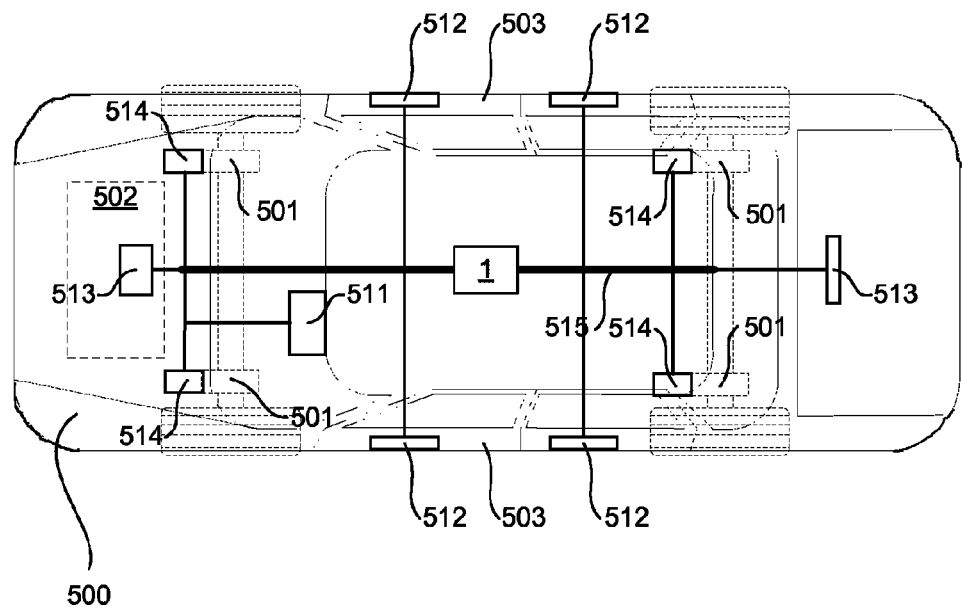
FIG. 10 schematically shows a top-view of an example of an embodiment of an apparatus including a data processing system.

The data processing system 1 may for example be included in an apparatus, for example, in a stationary system or a vehicle, such as a car or a plane or other type of vehicle. FIG. 10 shows an example of vehicle 500 in which a data processing system 1 is provided. The example shown in FIG. 10 includes an engine 502. An engine control node 513 may be present which can control and monitor the engine 502. The vehicle may further have break control nodes 514 which can control and monitor the breaks 501. The vehicle 500 may also have door lock control nodes 512 which can actuate the locking and unlocking of doors 503 of the vehicle 500. The nodes 512-514 may be connected to a display node 511 via a connection 515. At the display 511, for example, data can be outputted in a for humans perceptible form, for example, informing an occupant of the vehicle whether or not the doors 503 are locked and or the rotations per minute (rpm) the engine is running. The nodes 511-514 may, as shown in FIG. 10, be connected to the data processing unit 1 and may, for example, receive node control data or to transmit sensor data to the data processing system 1 which may then be used by an application running on the data processing system 1 to e.g. control the engine or the brakes.

In the foregoing specification, the invention has been described with reference to specific examples of embodiments of the invention. It will, however, be evident that various modifications and changes may be made therein without departing from the broader spirit and scope of the invention as set forth in the appended claims. For example, the data processing system may include a plurality of sets 2 and/or one or more system component $M_k, M_{k+1}$ without a partner component. The components may for example include one or more of the group consisting of: processor core, memory, peripheral. The data processing system may be implemented as a microprocessor. The components 200, 210 may for instance be implemented on a common carrier, such as on a joint piece of semiconductor material. Also, for example, at a given point in time, one or more of the sets 2 may be in the synchronous mode whereas one or more of the other sets are in the non-synchronous mode. For example, the processor core may be operating in synchronous mode while two other components (e.g. Direct Memory Access components) are in non-synchronous mode.

Furthermore, for example, when one signal path has a fault the system can be reconfigured (using the other bus) to reroute the data requests through the other paths while continuing the operations of the components. Thereby, the system 1 may be made more fail-operational with regard to physical defects of the signal paths.

Furthermore, some of the above embodiments, as applicable, may be implemented using a variety of different information processing systems. For example, although FIGS. 1-3 and the discussion thereof describe an exemplary architecture, this architecture is presented merely to provide a useful reference in discussing various aspects of the invention. Of course, the description of the architecture has been simplified for purposes of discussion, and it will be apparent that many different types of appropriate architectures may be used, such as for example a data path with a ring topology, a star topology or other suitable type of data paths.

Also, the invention is not limited to physical devices or modules implemented in non-programmable hardware but can also be applied in programmable devices or modules able to perform the desired device functions by operating in accordance with suitable program code. Furthermore, the devices may be physically distributed over a number of apparatuses, while functionally operating as a single device. For example, the data processing system may include two or more separate microprocessors, and for example include two or more central processing units (CPU) and/or two or more separate microcontrollers (µC) and/or two or more digital signal processors and/or two or more embedded processors.

Also, devices functionally forming separate devices may be integrated in a single physical device. For example, the data processing system 1 may be implemented as a single microprocessor, such as a central processing unit or a microcontroller. and/or a coprocessor. The data processing system 1 include may for instance include two or more processor cores and suitable memories and peripheral devices. The data processing system 1 may for example be implemented as a integrated circuit, such as a monolithic or hybrid integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage. The words 'connected' and/or 'coupled' do not request a direction connect, but (unless stated otherwise) include any connection, direct or indirect, suitable to perform a desired function.

The invention claimed is:

1. A data processing system, comprising:
 a first communication bus and a second communication bus;
 at least one set of components, said set including:
 a system component and a partner component,
 each having a communication interface for communicating data, said components being operable in a synchronized mode and a non-synchronized mode with respect to each other;
 said set further including a configuration control system connected to said system component and said partner component, for controlling said set to be in a synchronized mode configuration or a non-synchronized mode configuration, said configuration control system including:
 a first bus selector module connecting the communication interface of said system component to said first communication bus and said second communication bus and
 a partner bus selector module connecting the communication interface of said partner component to said first communication bus and said second communication bus,
 said bus selector modules being arranged to enable, depending on the configuration, communication of data to the respective component via at least one selected communication bus, selected from said first communication bus and said second communication bus, and to inhibit communication via the not selected communication bus(es).

2. A data processing system as claimed in claim 1, wherein said configuration control system includes:
- a first comparator module connected with at least one input to said first communication bus and said second communication bus; and
- a partner comparator module connected with at least one input to said partner component to said first communication bus and to said second communication bus;
- said comparator modules being connected with a control output to at least one of said communication interfaces, for controlling the respective component based on a comparison of data transmitted via the first communication bus with data transmitted via the second communication bus.

3. A data processing system as claimed in claim 2, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration.

4. A data processing system as claimed in claim 2, wherein said configuration control system includes:
- a component state sensor module connected with at least one input to said system component, and
- a partner state sensor module connected with at least one input to said partner component,
- said state sensor modules being arranged to determine whether or not the respective component is in a switch ready state, ready to be switched from synchronized mode to said non-synchronized mode and/or vice versa and said state sensor modules including an output for outputting a switch ready signal when the respective component is in said switch ready state.

5. A data processing system as claimed in claim 4, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration; and
- wherein said state sensor module are connected with their respective outputs to said mode transition control module, for transmitting said switch ready signal to the mode transition control module, and wherein said mode transition control module is arranged to output said mode transition signal in case switch ready signals from all the components in the set have been received.

6. A data processing system as claimed in claim 2, wherein said first comparator module and said partner comparator module each have a comparator output for outputting a result of said comparison and including a central control module connected to the comparator outputs, for comparing the results and controlling at least a part of the data processing system based on this result.

7. A data processing system as claimed in claim 6, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration.

8. A data processing system as claimed in claim 6, wherein said configuration control system includes:
- a component state sensor module connected with at least one input to said system component, and
- a partner state sensor module connected with at least one input to said partner component,
- said state sensor modules being arranged to determine whether or not the respective component is in a switch ready state, ready to be switched from synchronized mode to said non-synchronized mode and/or vice versa and said state sensor modules including an output for outputting a switch ready signal when the respective component is in said switch ready state.

9. A data processing system as claimed in claim 8, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration; and
- wherein said state sensor module are connected with their respective outputs to said mode transition control module, for transmitting said switch ready signal to the mode transition control module, and wherein said mode transition control module is arranged to output said mode transition signal in case switch ready signals from all the components in the set have been received.

10. A data processing system as claimed in claim 1, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration.

11. A data processing system as claimed in claim 10, wherein said configuration control system includes:
- a component state sensor module connected with at least one input to said system component, and
- a partner state sensor module connected with at least one input to said partner component,
- said state sensor modules being arranged to determine whether or not the respective component is in a switch ready state, ready to be switched from synchronized mode to said non-synchronized mode and/or vice versa and said state sensor modules including an output for outputting a switch ready signal when the respective component is in said switch ready state.

12. A data processing system as claimed in claim 11, wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration; and
- wherein said state sensor module are connected with their respective outputs to said mode transition control module, for transmitting said switch ready signal to the mode transition control module, and wherein said mode transition control module is arranged to output said mode transition signal in case switch ready signals from all the components in the set have been received.

13. A data processing system as claimed in claim 1, wherein said configuration control system includes:
- a component state sensor module connected with at least one input to said system component, and
- a partner state sensor module connected with at least one input to said partner component,
- said state sensor modules being arranged to determine whether or not the respective component is in a switch ready state, ready to be switched from synchronized mode to said non-synchronized mode and/or vice versa and said state sensor modules including an output for outputting a switch ready signal when the respective component is in said switch ready state.

14. A data processing system as claimed in claim 13,
- wherein said configuration control system includes a mode transition control module connected to said path selector modules, for transmitting a mode transition signal from the mode transition control module to said bus selector modules, in response to which said bus selector modules select said at least one selected communication bus in accordance with a desired configuration; and
- wherein said state sensor module are connected with their respective outputs to said mode transition control module, for transmitting said switch ready signal to the mode transition control module, and wherein said mode transition control module is arranged to output said mode transition signal in case switch ready signals from all the components in the set have been received.

15. A data processing system as claimed in claim 1, wherein said non-synchronised mode includes one or more of the group consisting of: a-synchronised mode, test mode, N-version software mode.

16. A data processing system as claimed in claim 1, including a plurality of sets and/or at least one system component without a partner component.

17. A data processing system as claimed in claim 1, wherein said components include one or more of the group consisting of: processor core, memory, peripheral.

18. A data processing system as claimed in claim 1, wherein said data processing system is implemented as a microprocessor.

19. An apparatus including a data processing system as claimed in claim 1.

20. A method for processing data in a data processing system, said system including a first communication bus and a second communication bus, at least one set of a system component and a partner component, each having a communication interface for communicating data, said components being operable in a synchronized mode and a non-synchronized mode with respect to each other; said method comprising:
- controlling said set to be in a synchronized mode configuration or a non-synchronized mode configuration, said controlling including:
- enabling, depending on a desired configuration, communication of data to the system component and the partner component via at least one selected communication bus, selected from said first communication bus and said second communication bus, and to inhibit communication via the not selected communication bus.

* * * * *